US008874247B2

(12) United States Patent
Stefik (10) Patent No.: US 8,874,247 B2
(45) Date of Patent: Oct. 28, 2014

(54) SYSTEM AND METHOD FOR IDENTIFYING MUSIC SAMPLES FOR RECOMMENDATION BY A USER

(75) Inventor: Mark Jeffrey Stefik, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 415 days.

(21) Appl. No.: 13/296,219

(22) Filed: Nov. 14, 2011

(65) Prior Publication Data
US 2012/0059738 A1 Mar. 8, 2012

Related U.S. Application Data (63) Continuation of application No. 11/877,574, filed on Oct. 23, 2007, now Pat. No. 8,060,227.

(60) Provisional application No. 60/993,356, filed on Sep. 10, 2007.

(51) Int. Cl.
*G06F 17/00* (2006.01)
*G06F 17/30* (2006.01)
*G06N 5/04* (2006.01)
*G06Q 30/02* (2012.01)
*G06Q 30/06* (2012.01)

(52) U.S. Cl.
CPC ............ *G06N 5/04* (2013.01); *G06F 17/30761* (2013.01); *G06Q 30/02* (2013.01); *G06Q 30/0623* (2013.01)
USPC .......................................................... 700/94

(58) Field of Classification Search
USPC ...................... 700/94; 455/3.06; 704/500–504
See application file for complete search history.

(56) References Cited

U.S. PATENT DOCUMENTS

| 6,766,523 | B2 * | 7/2004 | Herley .............................. 725/19 |
| 7,075,000 | B2 | 7/2006 | Gang et al. |
| 7,221,902 | B2 * | 5/2007 | Kopra et al. .................. 455/3.05 |
| 7,812,241 | B2 * | 10/2010 | Ellis ................................ 84/612 |
| 8,200,681 | B2 * | 6/2012 | Hedge et al. ................... 707/758 |
| 2003/0106413 | A1 * | 6/2003 | Samadani et al. .............. 84/603 |
| 2004/0125073 | A1 * | 7/2004 | Potter et al. .................... 345/156 |
| 2008/0052371 | A1 * | 2/2008 | Partovi et al. .................. 709/217 |
| 2008/0228689 | A1 * | 9/2008 | Tewary et al. ................... 706/48 |

OTHER PUBLICATIONS

John Markoff, "Apple Cuts iPhone Price Ahead of Holidays," N.Y. Times, Sep. 6, 2007.
S. Baumann et al., "BluetunA: Let Your Neighbour Know What Music You Like," CHI 2007 (Apr. 28-May 3, 2007).
Steven Levy, "Zune Should Go Beyond 'Squirting'," Newsweek, Nov. 27, 2006, p. 18.

(Continued)

*Primary Examiner* — Andrew C Flanders
(74) *Attorney, Agent, or Firm* — Patrick J. S. Inouye; Krista A. Wittman (57) ABSTRACT

A system and method for identifying music samples for recommendation by a user is provided. A music sample playing in an ambient environment is identified as selected by a recommending user. The music sample is recorded and information about the music sample is identified. A music recommendation describing the music sample is generated and includes at least a portion of the information. The music recommendation is transmitted from the recommending user to a recipient user. The portion of information from the music recommendation is integrated into a display of a music collection on a digital media player maintained by the recipient user and is displayed.

18 Claims, 6 Drawing Sheets

(56) References Cited

OTHER PUBLICATIONS

Smetters et al., "Instant Matchmaking: Simple and Secure Integrated Ubiquitous Computing Environments," Ubicomp 2006, Proceedings of the 8th International Conference of Ubiquitous Computing; Sep. 17-21, 2006; Irvine; CA; USA. Berlin: Springer Verlag; 2006; LCS 4206: 477-494.

Voida, A. et al., "Listening In: Practices Surrounding iTunes Music Sharing," CHI 2005 (Apr. 2-7, 2005).

* cited by examiner

SYSTEM AND METHOD FOR IDENTIFYING MUSIC SAMPLES FOR RECOMMENDATION BY A USER

CROSS-REFERENCE TO RELATED APPLICATION

This U.S. Patent Application is a continuation of U.S. patent application Ser. No. 11/877,574, filed Oct. 23, 2007, pending, which claims priority to U.S. Provisional Patent Application Ser. No. 60/993,356, filed Sep. 10, 2007, the disclosures of which are incorporated by reference.

FIELD

This application relates in general to music discovery and, in particular, to a system and method for identifying music samples for recommendation by a user.

BACKGROUND

Digital media players provide an easily customized, and increasingly ubiquitous, personal environment for experiencing digital media. Digital media players include units dedicated strictly to media playback, particularly digitally recorded music or video; hybrid units that provide media playback as part of a suite of functions, such as "smart" mobile telephones with integral media players; and virtual units that are implemented wholly in software for execution on a personal computer or similar device. Other digital media players are possible.

Figure 1:
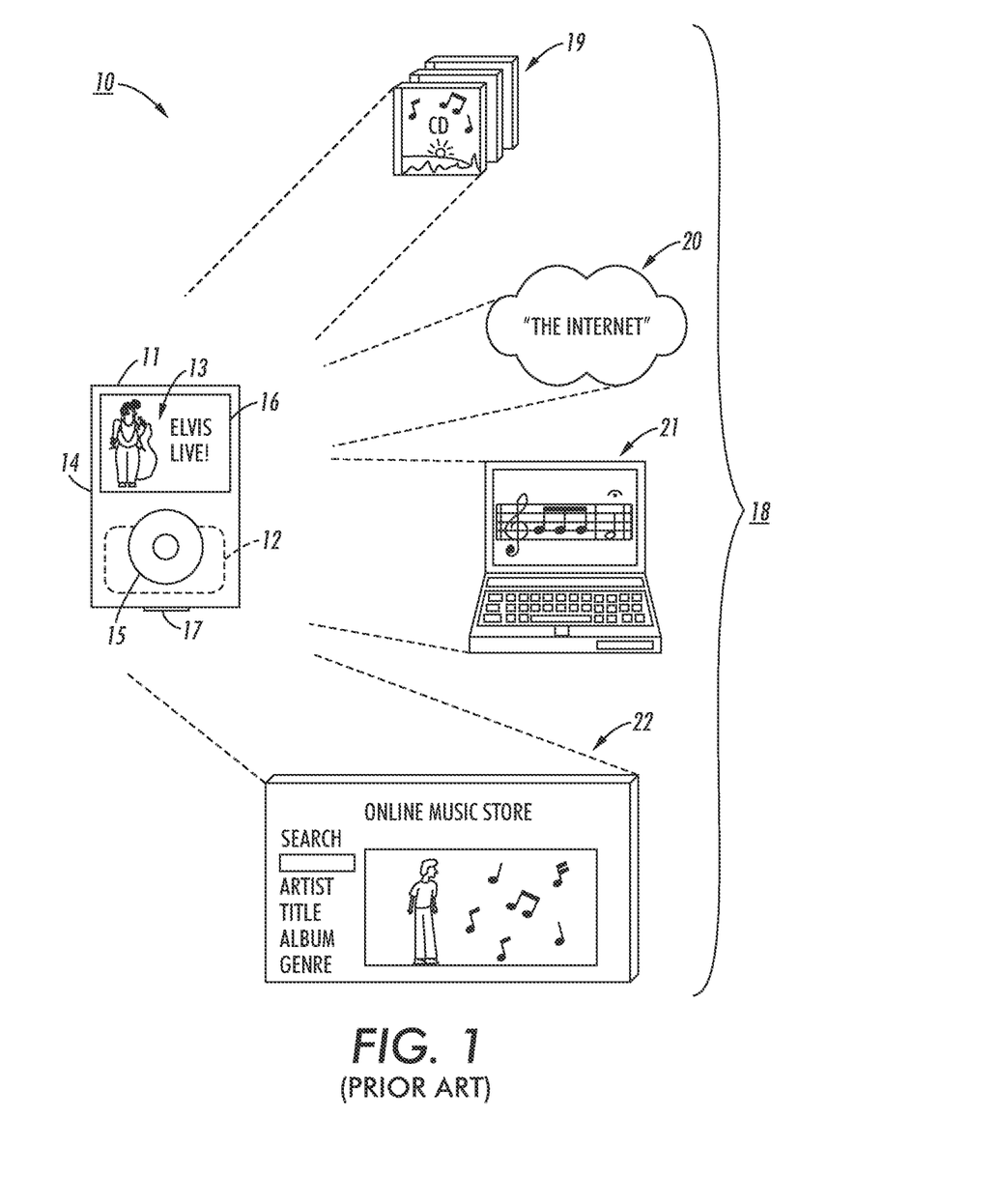
FIG. 1 is a functional block diagram showing a prior art personal music environment.

A portable digital media player for personal music enjoyment is illustrative of the features sets offered. For example, a digital media player could be loaded with an entire music collection and a music listener could choose music to play based on title, artist, genre, composer, album, or other criteria. The listener could also create play lists thematically organized for exercise, commute, home, or other purpose. FIG. 1 is a functional block diagram showing a prior art personal music environment 10. A typical portable digital media player 11 uses either solid state memory or hard disk storage to store a collection 12 of recorded digital media 13, and other data, such as a user profile. A user interface 14 provides tactile or voice controls 15 to select and play the media 13, and a display or other indication 16 that the media 13 is being played or viewed. The capabilities of the user interface 14 can vary, depending upon the size and form factor of the player 11. A data interface 17 allows the player 11 to upload the media 13 from external sources 18 and to synchronize data. The data interface 17 provides wired or wireless interconnections to host computers or network servers and can be data- or cellular-network capable. Other components are possible.

Conventionally, recorded digital media 13 must first be uploaded onto a digital media player 11 from an external source 18 before becoming available for selection or playback. Music packaged in physical form 19, such as cassette, LP record, or CD, must first be converted into compatible digital format, frequently requiring playback equipment and a personal computer. The proliferation of high bandwidth network access 20, such as the Internet, and the adoption of digital encoding allow media 13 to be purchased online and shared electronically through digital media stores 21 and similar online enterprises. Personal music composition software 22 provides a further source of media 13 for online sharing and critique.

Despite their conveniences, digital media players have their limitations. Discovering media beyond the scope of the stored media remains a process divorced from player usage. For instance, fellow aficionados must share their media recommendations by word of mouth or written message and the recipient must then separately find and review the media, after which the media must still be uploaded before finally becoming available. Moreover, musical tastes are notoriously subjective and dependent on mood, timing, locale, and other factors. Thus, a media recommendation recipient may not be open to suggestion at the time of receipt, thereby further alienating media discovery from player usage. As well, adding media encountered in the ambient environment to a stored collection requires identifying and remembering enough information about the media to identify the music or work, and later obtaining the media, which is a process generally removed in time, place, and circumstance.

Conventional approaches fail to adequately facilitate media discovery by digital media player users. The iPod digital media player and iTunes client software respectively sold and licensed by Apple Inc. provide full featured digital media playback, and digital media transfer and purchase through an online music store. Media can only be shared if part of the same collection, which is accessed through the client software. In addition, a recently announced collaboration between Starbucks Corporation, Seattle, Wash., and Apple Inc., Cupertino, Calif., enables a user of a Wi-Fi enabled iPod digital media player to find out the title of a song currently being played in a Starbucks café through the tap of a button, after which the song can be purchased and downloaded directly from an online music store. See, e.g., John Markoff, *Apple Cuts iPhone Price Ahead of Holidays*, N.Y. TIMES, Sep. 6, 2007, the disclosure of which is incorporated by reference. However, the service only operates in participating stores with subscribed iPod players and does not automatically integrate the song title into an existing music collection, absent purchase and download.

The Zune digital audio player and client software respectively sold and licensed by Microsoft Corporation, Redmond, Wash., provide limited wireless file sharing, and digital music purchase through an online music store. Stored digital audio can be shared between Zune users under a "three plays or three days, whichever comes first" policy. The policy is indiscriminately applied to any audio content transferred between players and shared songs expire unconditionally in three days, even if not played. File sharing is limited to other Zune users within physical range, and email, messaging, and recommendations from sources that are out of range remain unavailable. As a result, file sharing remains unappealing.

The MusicGremlin Portable Wi-Fi Device sold by MusicGremlin, Inc., New York, N.Y., provides a portable music player for use with a music subscription service, which allows a user to wirelessly search, play, and download music using the device. Programmed playlists and music purchased through a client personal computer can also be automatically downloaded to the device, and music recommendations can be exchanged with fellow subscribers. However, the device is tied to a specific subscription service. As well, the music recommendations are not contextually integrated into the device's playlist and lack ratings, which would help a recipient to evaluate their overall utility in light of other recommendations and sources.

A metadata sharing application for mobile phones is described in S. Baumann et al., "BluetunA: Let Your Neighbour Know What Music You Like," CHI 2007 (Apr. 28-May 3, 2007), the disclosure of which is incorporated by reference. Users of Bluetooth-enabled mobile phones can share information about their music preferences by allowing other users in proximity of their mobile phone to access information about their play list. However, the information sharing is limited by physical device range and works anonymously, thereby providing information untied to credibility or authoritativeness of the source.

Finally, online music services, such as Rhapsody, licensed by RealNetworks, Seattle, Wash., and Last.FM, licensed by Last.fm Ltd., London, UK, provide personalized music recommendations. Rhapsody offers a subscription music listening service that can provide personal music recommendations. Last.FM builds a profile of a user's musical tastes based on his listening habits as monitored from streamed radio stations or digital music player. The music recommendations, though, are based upon the user's own musical tastes and not evolved from external sources, such as through a social network.

Therefore, there is a need for integrating music recommendation and discovery into a personal listening environment, both in easing the manner of making a music recommendation and in presenting the recommendation to a music listener when most receptive.

SUMMARY

One embodiment provides a digital media player and method for facilitating music logging. A sample of music is recorded and encoded from an ambient environment. Information is added for a discoverer to describe one or more of an identification of, a source of, a context of, and a rating for the music sample. A sampling event is saved and includes the music sample and the information. At least part of the information from the sampling event is integrated into a display of a collection of music on a digital media player. The discoverer is enabled to directly act upon the music sample through the digital media player.

A further embodiment provides a system and method for identifying music samples for recommendation by a user. A music sample playing in an ambient environment is identified as selected by a recommending user. The music sample is recorded and information about the music sample is identified. A music recommendation describing the music sample is generated and includes at least a portion of the information. The music recommendation is transmitted from the recommending user to a recipient user. The portion of information from the music recommendation is integrated into a display of a music collection on a digital media player maintained by the recipient user and is displayed.

Accordingly, from a user's point of view, the continuum of actions from recommending to receiving recommendations, and of music logging become a convenient and integrated procedure that helps make music discovery an elegant and pleasant experience. From the perspective of music distributors, social networks become effective viral marketing channels for the "long tail" of less popular music selections.

In addition, recommendations from friends and other sources are integrated into a personal music collection in context. A user is thus able to locate new music for which there is good reason to believe that the user would be interested in listening. Moreover, the integration places the recommendations at a place where he would be likely to encounter the recommendations, particularly while browsing his own stored music. Music in his collection is thereby combined with other music in which he would likely have an interest.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Although described here in relation to digital music, the embodiments apply generally to all forms of digital media recordings, including audio and video recordings, as well as written information, such as news postings and Web pages. Additionally, digital media players embrace all forms of digital media playback device, including portable, mobile, and stationary players.

Music Recommendation and Presentation Overview

Figure 2:
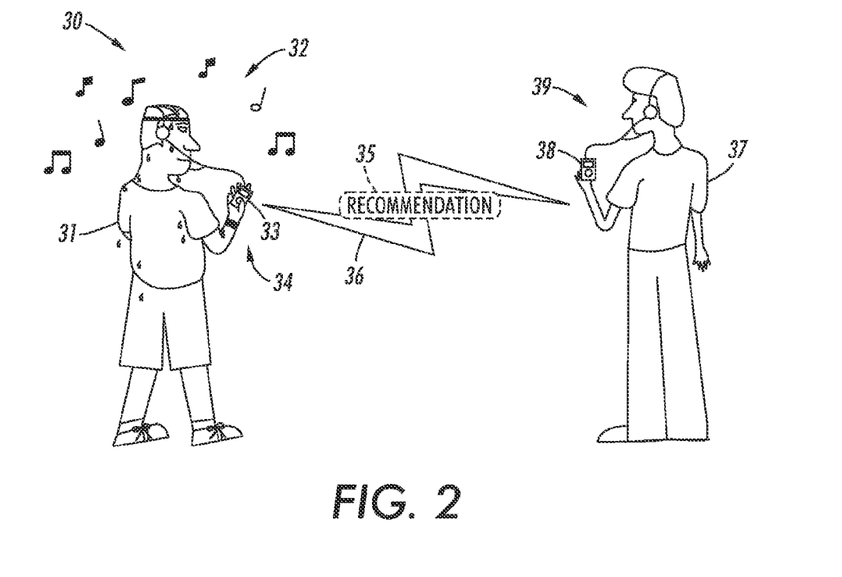
FIG. 2 is a functional block diagram showing a system for facilitating personal music recommending and social music discovery through sampling, identification, and logging.

Music can be efficiently recommended by one user of a digital media player to another user, even if the recommender and recipient users are separated by time, place, or circumstance. FIG. 2 is a functional block diagram showing a system for facilitating personal music recommending and social music discovery through sampling, identification, and logging 30. By way of example, two individuals 31, 37 are engaged in some fashion with their respective digital media players 33, 38, at the same or possibly different times. One of the individuals is a music recommender 31, while the other individual is a music recommendation recipient 37. The roles of recommender and recipient are interchangeable and can involve more than a single pair of music aficionados or digital media players.

The recommender 31 can decide to send a music recommendation 35 (operation 32) to the recipient 37 at any time while listening to or viewing the music collection stored on his player 33. The recommendation 35 could be for a limited excerpt, single song, selection of songs or "tracks," album, or music compilation. The recommender 31 could also be using his player 33 in some way other than listening to or perusing his stored music collection. For instance, if the player 33 is integral to a "smart" mobile telephone, the recommender 31 may decide upon a recommendation 35 while on a call. The recommender 31 picks the music and his player 33 generates the recommendation 35 (operation 34), either automatically or with assistance from the recommender 31. The contents of the recommendation 35 are further described below with reference to FIG. 4. In a further embodiment, the music can be digitally encoded to enable subsequent tracking, unless tracking is disallowed by the source, recommender, recipient, or other party. Once generated, the player 33 electronically sends the recommendation 35 (operation 36) to the recipient's player 38.

Unless the recommender 31 indicates otherwise, the player 33 automatically identifies the song currently in play or being viewed as the music to be recommended. The recommender 31 must specify a recipient 37 and the player 33 generates a music recommendation 35 that is subsequently transmitted to the recipient 37, such as described in commonly-assigned U.S. Pat. No. 8,666,525, issued Mar. 4, 2014, the disclosure of which is incorporated by reference. In a further embodiment, the music recommendation 35 and details regarding its use (not shown) can be subsequently tracked, unless tracking is disallowed by the recommender 31, recipient 37, or other party.

The recommendation 35 is received by the recipient's player 38 for presentation to the recipient (operation 39). Upon learning of the receipt of the recommendation 35 from his player 38, the recipient 37 can immediately listen to or view the recommendation 35, save the recommendation 35 for later presentation, or ignore or discard the recommendation 35 altogether. Absent other disposition, the recommendation 35 is automatically integrated into the recipient's music collection, such as described in commonly-assigned U.S. Pat. No. 8,340,796, issued Dec. 25, 2012, the disclosure of which is incorporated by reference. The music title or other information from the recommendation 35 appears as a virtual part of the recipient's music collection.

In a further embodiment, the music content itself may have to be separately obtained. For instance, the player 38 may fetch and cache a sample of recommended music, or even the entire digital work. By caching the recommended music in the background, the player 38 can make music exploration more responsive and enjoyable, so that a user does not have to wait for music to download before listening. In addition, the playing of the digital work may be subject to controls, such as digital rights management. The digital rights may allow the user to play the music once or to play a sample of the music. The digital rights could have other limitations. Finally, the player 38 may facilitate a commercial transaction, so that the user can easily purchase the music or obtain the music from a subscription service.

Music Logging Overview

Figure 3:
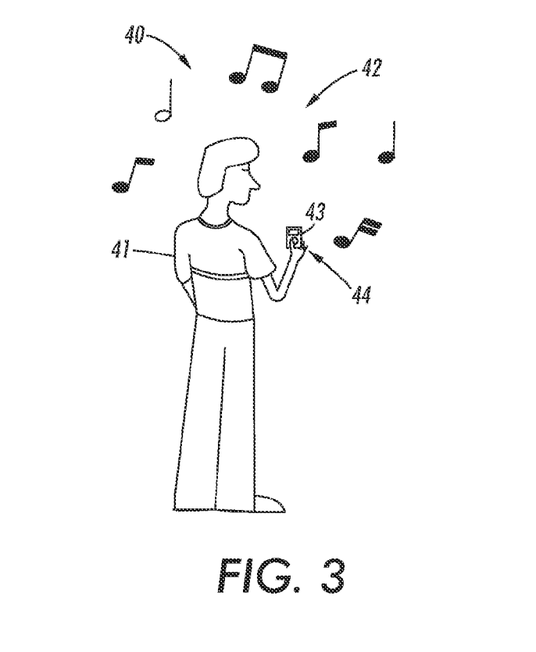
FIG. 3 is a functional block diagram showing a system for facilitating social music discovery through sampling, identification, and logging, in accordance with one embodiment.

Music can be efficiently discovered through logging by a digital media player, even if the viewing or playing of the music on the player is separated by time, place, or circumstance. FIG. 3 is a functional block diagram showing a system for facilitating music logging 40, in accordance with one embodiment. Music logging can occur on demand upon the action of an individual music "discoverer" 41, or autonomously by automatic music logging performed by his digital media player 41.

Figure 6:
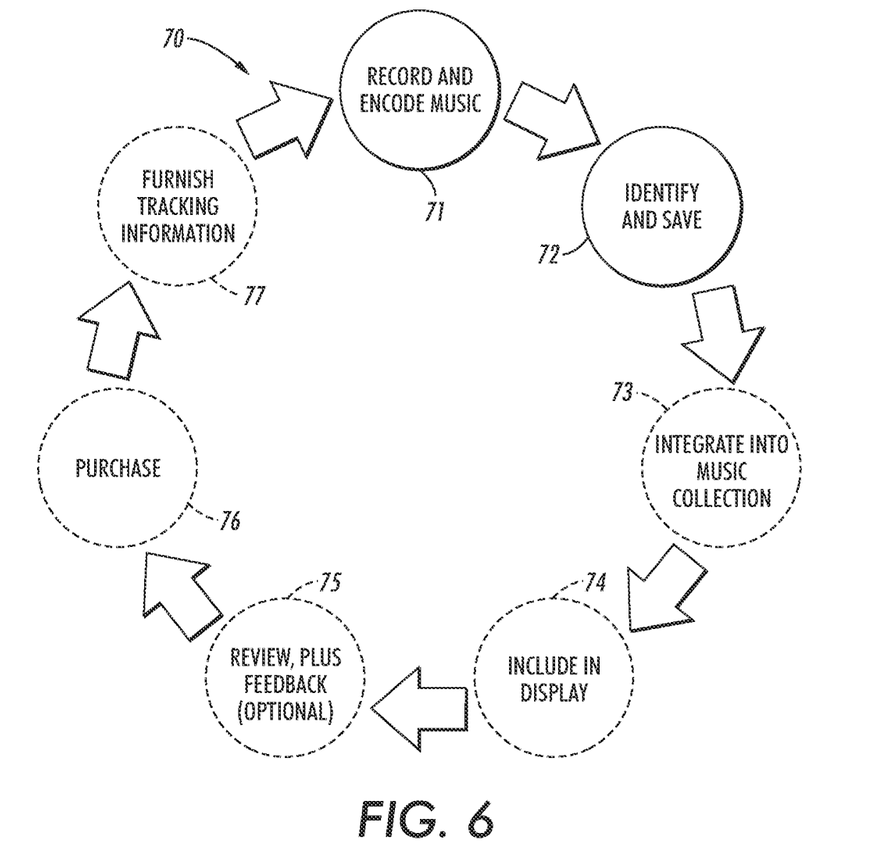
FIG. 6 is a process flow diagram showing a method for facilitating social music discovery through sampling, identification, and logging, in accordance with one embodiment.

The methodology of music logging or "discovery" 27 is further discussed below with reference to FIG. 6. Briefly, by way of example, the discoverer 41 could be engaged in some fashion with his digital media player 41. Upon hearing music playing in the ambient environment 42, the discoverer 41 decides to take a sample, that is, a short recording, of the music (operation 44). In a further embodiment, the player 43 automatically senses and samples the music without any further action by the discoverer 41. The music sample is thereafter identified, if possible, although the discoverer 41 may need to be prompted to choose a particular version if several known versions of the music are found. Following identification, the music is integrated into the discoverer's music collection. In a further embodiment, the music sample can be digitally encoded to enable subsequent tracking, unless tracking is disallowed by the source, recommender, recipient, or other party.

Music Recommendation Components

Figure 4:
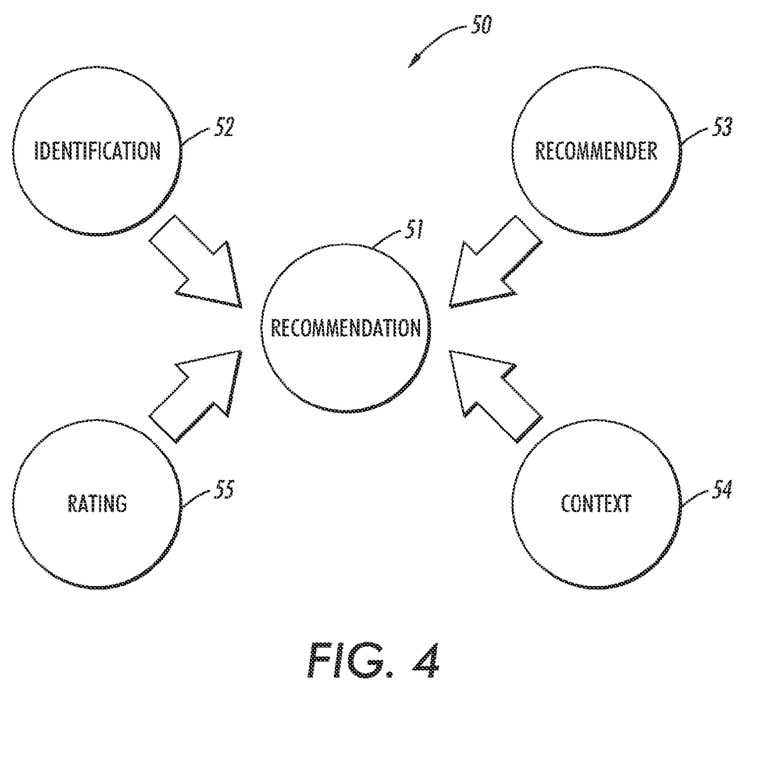
FIG. 4 is a data flow diagram showing, by way of example, components of a music recommendation.

A music recommendation contains information about the music that is being recommended. The music recommendation does not necessarily include the music itself, which could be separately obtained and uploaded by the recipient. FIG. 4 is a data flow diagram showing, by way of example, components 50 of a music recommendation 51. The components 50 are grouped into information relating to identification of the music 52, the recommender 53, the context 54 of the recommendation 51, and the associated rating 55. Other information components are possible.

Identification information 52 relates to information about the music or digital work itself. For clarity, the music that is being recommended will hereafter be referred to as a music selection, although the music could be a single tune or song, selection or related set of songs or "tracks," album, music compilation, or other type or form of related or associated music content. Specific identification information 52 can include the title of the music selection, performing artist, album name, genre, publisher, availability, length, digital identifier, and a sample of the music or work. Other specific identification information is possible.

The recommender information 53 identifies the source of the recommendation 51. Absent consent, personal privacy considerations may limit what information is provided for an individual that sent a recommendation, although an institutional recommender, such as a recommendation service or online store, might be willing or required to divulge their information. Specific recommender information 53 includes the recommender's name, relation, such as friend, subscribed, or automated system, address data, phone number, email address, and Web site. Automated system information includes data on usage, social filtering, or collaborative filtering. In addition, information concerning a self-recommendation, which must include an explicit act by the user to rate the music highly, as further described below with reference to FIG. 5, can include whether the information originates from a subscription or news service, or a sampling source. Other specific recommender information is possible, including text or voice annotations.

The context information 54 relates to the time, place, or circumstance of a recommendation. The specific context information available will depend upon the setting or environment in which the recommendation was made. For instance, the time and date of a recommendation can generally be discerned based on when the recommendation was sent, even if the recommender's digital media player lacks a built-in clock. However, the circumstances surrounding a recommendation may not be directly known, unless the recommender annotates the circumstances to the recommendation. Other context information would have to be either directly sensed by the digital media player, or indirectly derived. Thus, a geolocational receiver would be needed to automatically determine location if the digital media player is portable. Similarly, a calendar would have to be evaluated to match up events to recommendations, such as a concert, party, or holiday. Other specific context information is possible.

The rating information 55 is typically based on a Leikert scale. The rating could two-level or multi-level. The rating is generally from the recommender. Other specific rating information is possible.

Recommendation Sources

Figure 5:
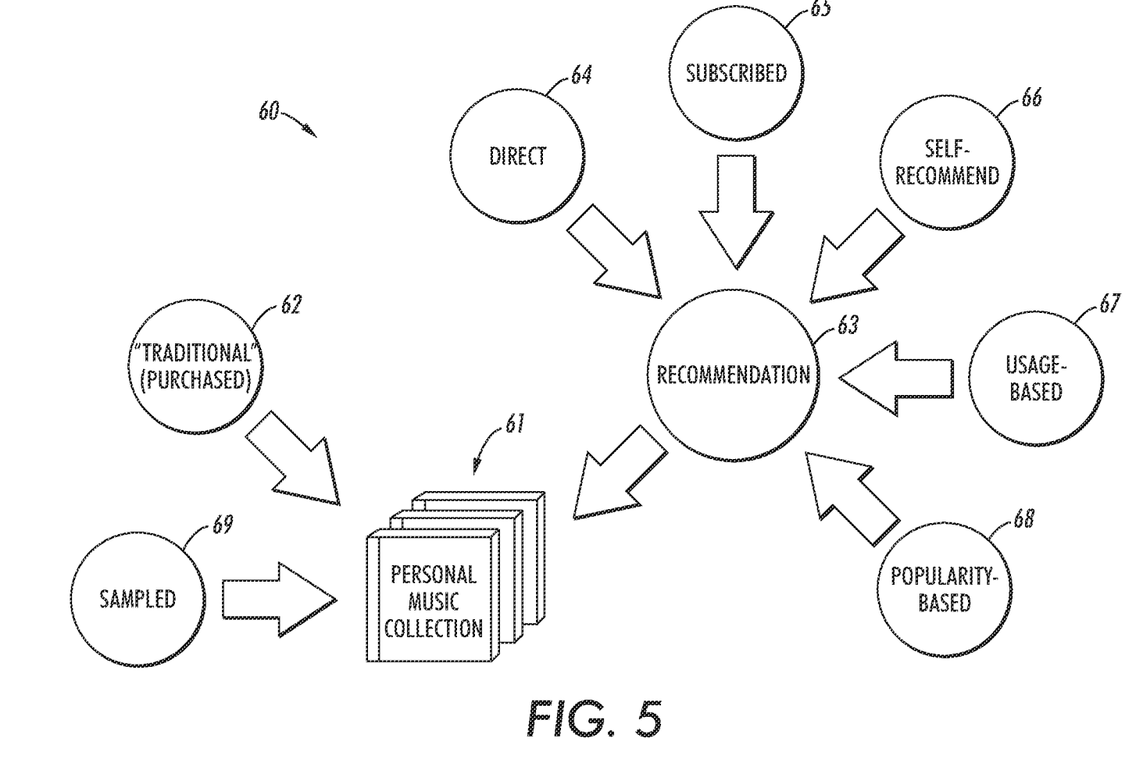
FIG. 5 is a data flow diagram showing, by way of example, sources of personal music.

Over time, a digital media player can amass a wide assortment of music, which has been received from various sources. FIG. 5 is a data flow diagram showing, by way of example, sources 60 of personal music. The sources 60 can be loosely grouped into "traditional" sources 62, recommendation sources 63, and sampled sources 69. The sources are merely representative of common music sources available to a music collector. Other music sources are possible.

Traditional sources 62 include storefront and online music retail channels, such as described above with reference to FIG. 1. However, this source places the burden of growing the personal music collection 61 on the collector, relying on his efforts and intuition to buy or obtain music as activities collateral to the use and enjoyment of his digital media player. The collector is left to seek out and audition music on his own before taking further steps to purchase or obtain, convert, upload, and integrate the music into his collection 61.

Recommendation sources 63 include several types of recommenders. A direct recommendation source 64 is a form of person-to-person recommendation and includes recommendations received from friends, family, colleagues, or fellow aficionados, such as described above with reference to FIG. 2. A direct recommendation source 64 is also known as social filtering or social recommendations. A recommendation originating from an online recommendation service or individual recommender, such as an online music critic that sends a music recommendation each week, constitutes a subscribed recommendation source 65. The user of the player can also be a self-recommendation source 66 for music or other digital media originating from an ambient source. The user signals approval, such as by tapping his player, that an ambient source identified by the player should be sampled for music logging. A usage-based recommendation source 67 is similar to a direct source 64, except by functioning implicitly to recommend music or other digital media by tracking listening habits and automatically generating a recommendation when user profile usage recommendation parameters are satisfied. Finally, a popularity- and profile-based recommendation source 68 bases recommendations on groups of users who appear to share common tastes. A recommendation is generated if group members buy or listen to certain music. A popularity and profile recommendation source 68 is also known as collaborative filtering or collaborative recommendations. Other types of recommendation sources are possible.

The quality or authoritativeness of the recommendation source matters. Recommendations from trusted sources are considered more reliable than sources that generally send irrelevant or uninteresting recommendations. The recommender information 53 and context information 54 included as part of each recommendation 51 (shown in FIG. 4) can help a collector to organize or filter recommendations, as well as the recommenders themselves, as further described below with reference to FIG. 9. For instance, reliable recommenders whose recommendations are generally trusted and followed may be rated higher or assigned greater weight than other recommenders. In addition, the recommendations from those trusted recommenders could also be displayed more prominently to reflect their higher credibility or greater weight. Conversely, recommendations from seldom-followed or untrusted recommenders could be automatically ignored or discarded.

Finally, sampled sources 69 include music recommended by the user himself and samples autonomously collected from an ambient environment. Like recommendation sources 63, sampled sources 69 can be evaluated and rated. Raw samples from random music logging might be the lowest rated, as the music would likely be of lowest interest. Self-recommended music, though, might be highly rated, particularly where the music selection sampled can be completely identified from the music sample alone. For example, if music logging takes place "on demand," the act of taking the sample reflects the user's intention and implies a high rating. If music logging is proactive, that is, autonomous, the user could signal a rating while the music is playing, or could add a rating later while listening to the music. Other types of sampled sources are possible.

Music Logging

Music logging involves the recording a sample of music from the ambient environment, encoding the sample, identifying the music in the sample, and subsequently saving the sampling event. FIG. 6 is a process flow diagram showing a method for facilitating social music discovery through sampling, identification, and logging 70, in accordance with one embodiment. The method is performed as a series of process steps or operations executed by a digital media player or similar device.

Music logging is generally performed at the behest of a music discoverer or unilaterally by a digital media player on behalf of a music discoverer. Music logging begins with the recording and encoding of a sample of the music (operation 71). The music sample includes both the recorded sample and as much recommendation information 51 that can be ascertained, as further described above with reference to FIG. 4. In simplest form, the discoverer only has to push a single "Sample" button on his player to sample the music. The "Sample" button is analogous to a "Record" button on a portable voice recorder. In a further embodiment, the user interface of the player could provide a range of means to sample music. For instance, the player could include a motion sensor or accelerometer that accepted physical gestures as inputs, such as a shake, tap, or other movement, which would each signify the choice of a short recording, such as a recording that is 30-seconds long, continuous sampling, or other selection. Physical gestures could also be used to mean "take a sample now." In addition, for proactive music logging, physical gestures could be used to signal a rating. Finally, the player could provide voice recognition by which the discoverer could control music logging.

In a further embodiment, the player could automatically initiate music logging whenever the player sensed music or a music source. The player could also start music logging based on a user profile. For example, the player could start music logging upon sensing that the discoverer has entered a particular location or environment, such as a concert or party. Based on the user's profile, the player would automatically take a music sample.

Thereafter, the music sample is identified and a record of the sampling event is saved in a log file (operation 72). The information contained in the record includes the music sample itself, any identifying information, the context, such as time and place, if known, and any rating information together with the source of the rating. If possible, the sample is identified as originating from a published recording by a particular artist. In other cases, the artist or the work may be identified, but may have more than one possible match. Ideally, each music sample contains enough material to enable identification through automated means, such as by a music identification services, or manually. The discoverer could include annotations with self-initiated samples that could later serve to jog the memory or provide better context with which to identify the music.

In a further embodiment, the player could automatically analyze the recommendation information 51, including any available context information 54, to provide background to the sample. In particular, an unrated sample, such as recorded through ambient autonomous sampling, would be assigned a low degree of interest based on the lack of rating and would generally not appear prominently amongst other displayed recommendations. Lowering the rating threshold would exacerbate, rather than improve, the display of the unrated sample, as the unrated sample would likely be subsumed by other unrated or lower rated displayed recommendations. However, correlating the time and date of a sample, specifically an unrated sample, to an event on the user's calendar or generating a timeline with one or more clusters of music recommendations would provide a contextual handle to filter music collection browsing and thereby permit the discoverer to, for instance, remember where he heard the music or the context in which he enjoyed the music. Thus, the unrated sample would prominently appear among other samples topically displayed in context with calendar events, such as "Heard Today, "Heard Yesterday," or "Heard at Paige's Party." Other event-related displays are possible.

In a still further embodiment, the player attempts sample identification, yet is unable to unambiguously identify the sample, such as where the player encounters several competing selections, versions, or other possible matches. The player consequently generates a description that bundles the ambiguous answer with the sample. Descriptions could be based on whatever information, if any, is known, such as "Any tune by Enya," "Any version of 'Along the Watchtower,'" or "Any version of 'Amazing Grace' by Della Reese." The discoverer or listener can then use the description to explore the set of music selections matching the sample. The description could also be useful for making recommendations.

The recommended music selections are then automatically integrated into the personal music collection (operation 73). Any information included with the recommendation, such as identification of the music, the recommender, the context of the recommendation, and the associated rating, are also extracted or processed. "Integration" effectively expands the scope of the recipient's music collection by including already-owned, recommended, and sampled music selections as a logical part of the music collection. The integration need not be the addition of the actual music into the music collection. If available, a sample or play-limited version could instead be added, or only the recommendation may be integrated, such as narrative only.

In a further embodiment, a music selection could be automatically downloaded by a digital media player upon receiving, for instance, a strong recommendation or other criteria. The automatic download would improve performance on players with limited downloading bandwidth. Additionally, the downloaded music selection could be a rendition with initial limitations on playback rights, such as a music sample or play-limited version. Upon playing the downloaded music selection, the recipient could indicate a desire to purchase, unless already indicated by default in his user profile. The initial playback rights limitations would subsequently be removed to allow immediate access to a full version of the music selection without the download waiting time. The player would attend to payment and transaction accounting in the background.

Figure 7:
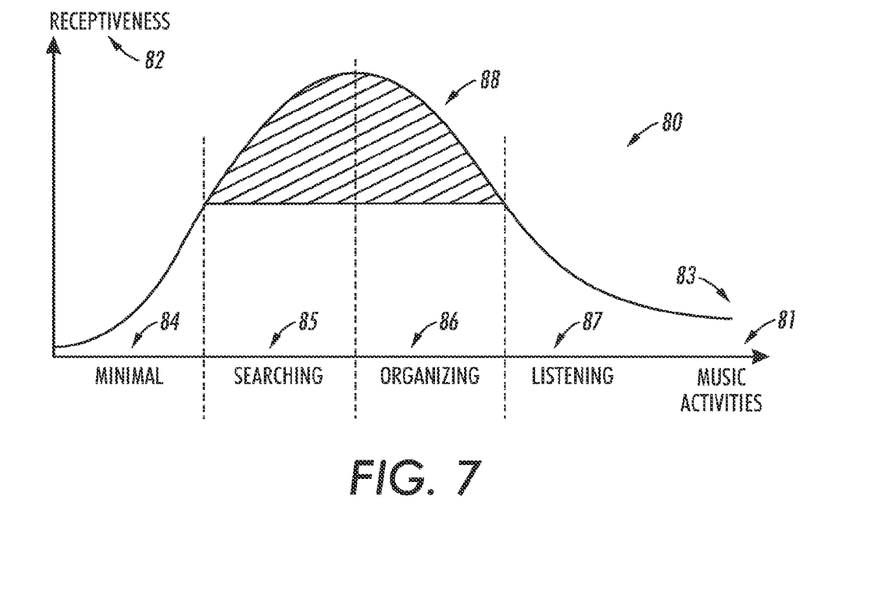
FIG. 7 is a graph showing, by way of example, receptiveness to music-selection suggestion as a function of music activity.

When optionally viewed through a navigation pane (operation 74), the title or other information for each music selection is logically inserted into the music collection under the same display parameters as any previously-identified and stored music. For ease of use, however, the recommended music selections are preferably displayed using a different font, color, or other display attribute, as further described below with reference to FIG. 8. In addition, where other types of digital media are being recommended, the recommendations are viewed in analogous display settings. For instance, integrated video recommendations would appear in a navigation pane listed under a "To See" log, while integrated news recommendations would appear in a "To Read" log or in a daily news listing under a matched topic. Logically integrating the recommended music selections into the music collection helps to opportunistically suggest the potential purchase of music to the recipient 25 at a time when he may be most receptive. FIG. 7 is a graph 80 showing, by way of example, receptiveness to music-selection suggestion as a function of music activity. The x-axis 81 represents music-related activities as a continuum of personal involvement on the part of the music listener. The y-axis 82 represents the relative level of receptiveness experienced by a music listener in increasing order.

Receptiveness 83 can be diagrammatically depicted as a function of music-related activities. Minimal activity 84 occurs when the user is having little to no involvement with his player. Searching activity 85 is goal-oriented and occurs when the user is trying to find a particular selection of music, which is also when the user would likely welcome relevant recommendations. The player enlarges the search scope to include the recommendation information, as described above with reference to FIG. 4. Organizing activity 86 occurs after music has been found, but prior to listening, such as while composing a play list. During organizing activity 86, the available selections of music have been narrowed down by taste or other criteria and recommendations only appear within the display parameters in force. Finally, listening activity 87 connotes the actual playing of music on the player. The shaded area 88 of the receptiveness curve 83 respectively bounded by the searching and organizing activities 85, 86 represents peak receptiveness, during which times the listener is most likely to be receptive to a recommendation. Integrating the music recommendations into the display thereby ensures that the recommendations are available both in form with existing music for purposes of organization and through recommendation information for location through search.

Referring back to FIG. 6, the integration of recommended music selections enables the recipient to conveniently act upon a recommendation. The recipient can review each recommendation by reading or listening to the recommendation information and any annotations or other information (operation 75). The recipient can also optionally provide feedback to the recommender. The recipient could also proceed to purchase the music selection (operation 76) from a music retail channel. Preferably, the player omits offering purchase of already-owned music. To provide ease of use, the user interface of the digital media player facilitates recommendation review, purchase, or other recipient action by a single simple action, such as pressing a button, gesturing with the player, tapping a part of the screen, speaking a particular key phrase, and so forth. User actions could also be specified by default, such as automatically purchasing music with a strong recommendation. Finally, if permitted by the recipient, recommender, or other party, the tracking information could also be furnished to the music retail channel or other party (operation 77). Tracking information can include information about the music selection purchased and demographic information about the recipient, although other tracking information is possible. Still other music logging operations are possible.

Visual Display

Figure 8:
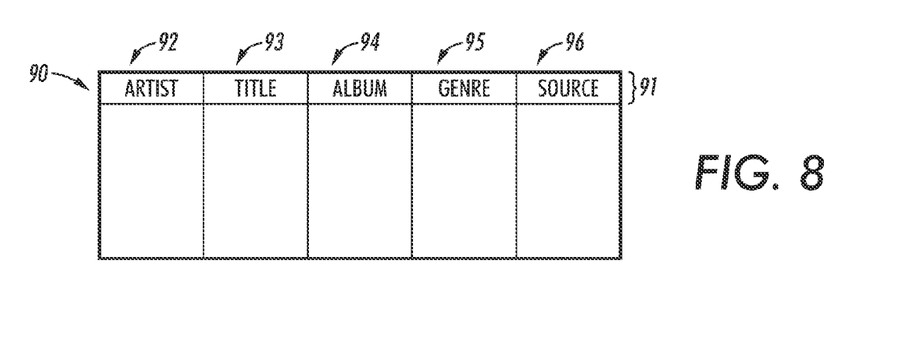
FIG. 8 is a screen diagram showing, by way of example, a visual display for a personal music collection for use with the systems of FIGS. 2 and 3.

Limits on human visual perception and digital manipulative abilities restrict the physical sizes of the displays and controls provided in the user interfaces of digital media players. FIG. 8 is a screen diagram showing, by way of example, a visual display 90 for a personal music collection for use with the systems of FIGS. 2 and 3. The visual display 90 assumes sufficient space to provide multiple rows of information regarding a personal music collection. The display 90 is supplemented with controls (not shown) to enable navigation and selection of music, although the composition of play lists is generally performed offline, where text entry capabilities are available. The display 90 includes parameters 91 to display music selections by artist 92, title 93, album 94, genre 95, and source 96, although other display parameters are possible. Each column is sortable and searchable, as accommodated by the controls.

Music selections, both recommended and sample music that has been identified, are included in the visual display as an integral part of the music collection. In general, the amount of information displayed is sensitive to the amount of space available and allocated in the display. For example, on a player in which a user can "open" or "close" the folders for groups of music shown in a display, opening a Celtic folder would show all artists and albums in the Celtic genre. Closing the same folder might just show the genre, Celtic, and not the music contained within. The display of recommendations thus follows the display of the music. If all music selections are displayed, recommendations in the Celtic genre would show up closest to the most relevant selections. However, if the folder is closed, the player would only show the numbers of music selections and recommendations. In addition, the display can incorporate further useful elements. When a user is looking at a recommendation, controls could enable him to read or listen to any message from the recommender. The display could also show when the recommendation was made and any rating provided by the recommender. If there is more than one recommendation for a music selection, the user may want to read or listen to multiple recommendations. Finally, controls could facilitate buying, such as from an online music retailer, or otherwise obtaining the recommended music, for instance, from a subscription service.

The type of music selection, that is, existing music, recommended music, and sampled music, can be indicated using a different font, color, or other display attribute. In addition, the quality or authoritativeness of the recommender can be applied, either in how the music selection appears or whether the music selection is rated or omitted. Moreover, the "staleness" of a music selection could affect manifestation in the visual display. For instance, a recommendation or sample that is significantly older than more recent music selections might be filtered out. Other visual display criteria are possible.

In a further embodiment, the spatial arrangement of the integrated music selections can be controlled to help distinguish recommended or sampled music from already-existing music acquisitions. Various indications can be used, including representing each piece as an icon or symbol, placing the recommended pieces adjacent to the music collection, or ordering and highlighting the recommended pieces within the music collection. In addition, a calendar could be generated to match up events to recommendations, such as a concert, party, or holiday, or a timeline could be created with one or more clusters of music recommendations, such as further described above with reference to FIG. 6. Still other spatial arrangement or indications are possible.

Music Suggestion Placement

Figure 9:
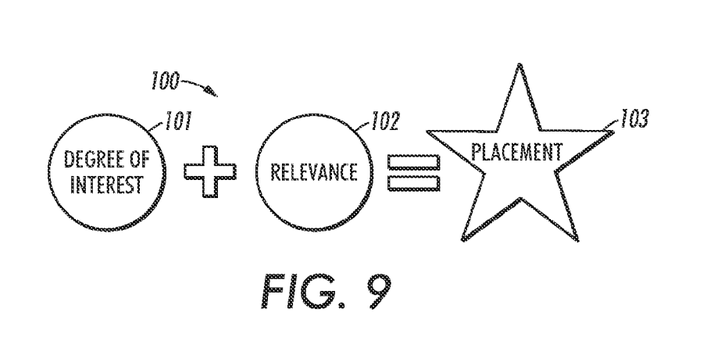
FIG. 9 is a process flow diagram showing music suggestion placement in a visual display for use with the methods of FIGS. 2 and 3.

The recommended and sampled music selections are logically integrated into the visual display in an ordering to help ensure relevant and useful placement. FIG. 9 is a process flow diagram showing music suggestion placement in a visual display for use with the methods of FIGS. 2 and 3. The ordering determines placement as a function of degree of interest and contextual relevance.

First, the degree of interest 101 rates whether a recommendation is expected to be of interest to the listener in any context. The degree of interest 101 depends upon recommendation-specific factors, such the recommendation source and associated reliability, described above with reference to FIG. 5; the recommender's level of intention; the reliability of the recommender; and timing, that is, when the recommendation was sent. A recommender whose recommendations are generally followed, such as a subscribed recommendation source, would be assigned more weight than a seldom-followed recommender, like a collaborative recommendation. Similarly, a recommendation recently sent would be afforded greater weight than a stale recommendation. Other factors weighing into degree of interest 101 are possible.

Second, the contextual relevance 102 characterizes the current listening context of the listener and can include evaluation of the possible spectrum of music-related activities 81, as described above with reference to FIG. 7. Contextual relevance seeks to identify those recommendations to which a listener would presently be most receptive. For example, a listener browsing "Baroque music" would not likely have much interest in contemporary pop or light jazz. Contextual relevance can be derived, for instance, from the display, which generally is constrained to show only a subset of an overall personal music collection. Thus, contextual relevance applies similar constraints, such as genre, artist, and so forth, in evaluating the recommendations to show. Other types of contextual relevance are possible.

Finally, placement 103 is a function of the degree of interest and contextual relevance 102. A music selection from a recommendation that reflects a sufficient degree of interest and which is contextually relevant may be placed or integrated into the collection. Actual placement 103 applies the same constraints as listed music, and thus depends upon the ordering principles of the listing and the relatedness of the recommended music to the displayed music. Other forms of placement are possible.

While the invention has been particularly shown and described as referenced to the embodiments thereof, those skilled in the art will understand that the foregoing and other changes in form and detail may be made therein without departing from the spirit and scope.

What is claimed is:

1. A system for identifying music samples for recommendation by a user, comprising:
   a user profile;
   a portable digital media player maintained by a recommending user, comprising:
      a microphone to identify a music sample playing in an ambient environment that is selected by the recommending user and to automatically record the music sample based on the user profile;
      an identification module to identify information about the music sample; and a recommendation module to generate a music recommendation describing the music sample comprising at least a portion of the information and to transmit the music recommendation from the recommending user to a recipient user; and a further portable digital media player maintained by the recipient user, comprising:

an integration module to integrate the portion of information from the music recommendation into a display of a music collection; and an output module to display the portion of information to the recipient user.

2. A system according to claim 1, wherein the portable digital media player further comprises:

an integration module to integrate at least a portion of the information about the music sample into a display of a music collection.

3. A system according to claim 1, wherein at least one of the portable digital media player and the further portable digital media player comprises:

a calendar of events; and a context module to compare the music sample to the calendar, to identify an event that matches the music sample, and to display the music sample with the matching event.

4. A system according to claim 1, wherein at least one of the portable digital media player and the further portable digital media player further comprises:

an identification module to identify the music sample as a published recording by an artist;

a presentation module to display the music sample during a time comprising at least one of organizing music selections and searching for particular music selections by one or more of the recommending user and the recipient user; and a feedback module to receive feedback regarding the music sample from at least one of the recommending user and the recipient user.

5. A system according to claim 1, wherein the portable digital media player further comprises:

an annotation module to associate annotations by the recommending user with the music sample.

6. A system according to claim 1, wherein the recommendation comprises at least one of the music sample, the recommending user, a context of the recommendation, and an associated rating for the music sample.

7. A system according to claim 1, wherein the music sample is offered for sale via a retail channel only when the music sample is not previously owned.

8. A system according to claim 1, wherein demographic information of at least one of the recommending user and the recipient user is tracked.

9. A system according to claim 1, wherein the music sample is automatically downloaded based on a strength of the recommendation for that sample.

10. A method for identifying music samples for recommendation by a user, comprising:

identifying a music sample playing in an ambient environment that is selected by a recommending user;

maintaining a user profile;

automatically recording the music sample based on the user profile and identifying information about the music sample;

generating a music recommendation to describe the music sample comprising at least a portion of the information;

transmitting the music recommendation from the recommending user to a recipient user;

integrating the portion of information from the music recommendation into a display of a music collection on a digital media player maintained by the recipient user; and displaying the portion of information to the recipient user.

11. A method according to claim 10, further comprising at least one of:

integrating at least a portion of the information about the music sample into a display of a music collection on a further digital media player maintained by the recommending user.

12. A method according to claim 10, further comprising at least one of:

maintaining a calendar of events;

comparing the music sample to the calendar;

identify an event that matches the music sample; and displaying the music sample with the matching event.

13. A method according to claim 10, further comprising at least one of:

identifying the music sample as a published recording by an artist;

displaying the music sample during a time comprising at least one of organizing music selections and searching for particular music selections by one or more of the recommending user and the recipient user; and receiving feedback regarding the music sample from at least one of the recommending user and the recipient user.

14. A method according to claim 10, further comprising:

associating annotations by the recommending user with the music sample.

15. A method according to claim 10, wherein the recommendation comprises at least one of the music sample, the recommending user, a context of the recommendation, and an associated rating for the music sample.

16. A method according to claim 10, further comprising:

offering for sale the music sample via a retail channel only when the music sample is not previously owned.

17. A method according to claim 10, further comprising at least one of:

tracking demographic information of at least one of the recommending user and the recipient user.

18. A method according to claim 10, further comprising at least one of:

automatically downloading the music sample based on a strength of the recommendation for that sample.

* * * * *